US00RE42553E

(19) United States
(12) Reissued Patent
de Pous et al.

(10) Patent Number: US RE42,553 E
(45) Date of Reissued Patent: Jul. 19, 2011

(54) DEVICE FOR ATTACHING A DISPENSER MEMBER TO A RECEPTACLE

(75) Inventors: Olivier de Pous, Paris (FR); Yannic Hermouet, Saran (FR)

(73) Assignee: Valois of America, Inc., Greenwich, CT (US)

( * ) Notice: This patent is subject to a terminal disclaimer.

(21) Appl. No.: 11/100,576

(22) Filed: Apr. 7, 2005

Related U.S. Patent Documents

Reissue of:
(64) Patent No.: 6,543,648
Issued: Apr. 8, 2003
Appl. No.: 10/136,211
Filed: May 1, 2002

U.S. Applications:
(60) Continuation of application No. 09/654,018, filed on Sep. 1, 2000, now Pat. No. 6,409,049, which is a continuation of application No. 09/099,684, filed on Jun. 18, 1998, now Pat. No. 6,186,359, which is a division of application No. 08/725,934, filed on Oct. 7, 1996, now Pat. No. 5,799,810, which is a division of application No. 08/311,041, filed on Sep. 22, 1994, now Pat. No. 5,562,219.

(51) Int. Cl.
*B67B 1/00* (2006.01)

(52) U.S. Cl. ..... 222/153.09; 222/321.9; 222/385; 215/274; 215/276; 220/319

(58) Field of Classification Search ..... 222/321.1, 222/365, 321.3, 570, 321.7, 321.8, 321.9, 222/153.1, 153.09; 215/274–276, 247, 249; 220/319
See application file for complete search history.

(56) References Cited

U.S. PATENT DOCUMENTS
34,976 A 4/1862 Nicholson
(Continued)

FOREIGN PATENT DOCUMENTS
AT 114665 10/1929
(Continued)

OTHER PUBLICATIONS
Rapport De Recherche Préliminaire for FR 00.13567 (2 pages).
(Continued)

*Primary Examiner* — Frederick C. Nicolas
(74) *Attorney, Agent, or Firm* — Sughrue Mion, PLLC

(57) ABSTRACT

An attaching ring or fixing ring is provided for attaching or fixing a dispenser member to a neck of a receptacle containing a substance to be dispensed. The ring is annular and has a bottom portion and a top portion. In a preferred embodiment, the bottom portion includes snap-fastening tabs for fixing the ring to the neck. The top portion includes an opening for the dispenser and a surrounding structure for securing the dispenser member to the neck. The top portion further includes at least one guide wall element extending parallel to the longitudinal axis of the dispenser member and around the periphery of the fixing ring substantially in line with the snap-fastening tabs. A hoop can be provided for preventing the tabs from splaying apart. The hoop can include an internal projection, such as a vertical rib or a thread.

46 Claims, 11 Drawing Sheets

U.S. PATENT DOCUMENTS

| | | | | | |
|---|---|---|---|---|---|
| 681,774 | A | | 9/1901 | Bailey | |
| 835,366 | A | | 11/1906 | Purcell | |
| 886,994 | A | | 5/1908 | Lalau | |
| 1,609,453 | A | | 12/1926 | Atwood | |
| 1,758,696 | A | | 5/1930 | Graham | |
| 1,982,497 | A | | 11/1934 | Cotchett | 299/97 |
| 1,985,258 | A | | 12/1934 | Mauser | |
| 2,045,480 | A | | 6/1936 | Magnesen et al. | 215/45 |
| 2,117,407 | A | | 5/1938 | Davis | |
| 2,125,790 | A | | 8/1938 | Johnson | 215/22 |
| 2,132,775 | A | | 10/1938 | Casablancas | 215/45 |
| 2,339,343 | A | | 1/1944 | Magnesen | |
| 2,347,605 | A | | 4/1944 | Magnesen | 215/45 |
| 2,372,725 | A | | 4/1945 | Koehler | |
| 2,398,554 | A | | 4/1946 | Nyden | |
| 2,421,356 | A | | 5/1947 | Saffady | |
| 2,439,845 | A | | 4/1948 | De Swart | |
| 2,444,779 | A | | 7/1948 | Krasberg | 215/45 |
| 2,483,055 | A | | 9/1949 | Krasberg | 215/45 |
| 2,576,580 | A | | 11/1951 | Edwards | 215/45 |
| 2,723,773 | A | | 11/1955 | Greene | |
| 2,814,405 | A | | 11/1957 | Edwards | |
| 3,055,560 | A | | 9/1962 | Meshberg | |
| 3,120,906 | A | | 2/1964 | Harnage | 222/321 |
| 3,138,304 | A | | 6/1964 | Raehs et al. | 222/394 |
| 3,159,318 | A | | 12/1964 | Green | |
| 3,191,815 | A | | 6/1965 | Graham et al. | 222/394 |
| 3,248,021 | A | | 4/1966 | Corsette et al. | 222/321 |
| 3,270,904 | A | | 9/1966 | Foster | 215/43 |
| 3,297,187 | A | | 1/1967 | Thiesen | |
| 3,301,425 | A | | 1/1967 | Brandtberg | 215/45 |
| 3,435,998 | A | | 4/1969 | Kahn et al. | 222/402.24 |
| 3,470,893 | A | | 10/1969 | Nelson | |
| 3,583,605 | A | | 6/1971 | Corsette | |
| 3,586,196 | A | | 6/1971 | Barton et al. | |
| 3,659,736 | A | | 5/1972 | Riggs | 215/40 |
| 3,831,820 | A | | 8/1974 | Focht | |
| 3,905,502 | A | | 9/1975 | Wassilieff | 215/250 |
| 3,949,912 | A | | 4/1976 | Meshberg et al. | |
| 3,973,688 | A | | 8/1976 | Kvam | |
| 3,977,576 | A | | 8/1976 | Amabili | |
| 3,986,248 | A | | 10/1976 | Meshberg et al. | |
| 4,051,983 | A | | 10/1977 | Anderson | |
| 4,061,239 | A | | 12/1977 | Tasseron | |
| 4,073,398 | A | | 2/1978 | Schultz | |
| 4,109,820 | A | | 8/1978 | Stifano | |
| 4,144,987 | A | | 3/1979 | Kishi | |
| 4,173,297 | A | | 11/1979 | Pettersen | 222/321 |
| 4,193,551 | A | | 3/1980 | Saito et al. | 239/320 |
| 4,216,883 | A | | 8/1980 | Tasaki et al. | 222/321 |
| 4,251,003 | A | | 2/1981 | Bodenmann | |
| 4,279,353 | A | | 7/1981 | Honma | |
| 4,282,211 | A | | 8/1981 | McAlpine et al. | |
| 4,324,351 | A | | 4/1982 | Meshberg | |
| 4,359,166 | A | | 11/1982 | Dubach | |
| 4,389,003 | A | | 6/1983 | Meshberg | |
| 4,454,965 | A | | 6/1984 | Kirk, Jr. | |
| 4,773,553 | A | | 9/1988 | Van Brocklin | |
| 4,984,702 | A | | 1/1991 | Pierpont | 215/272 |
| 5,096,094 | A | | 3/1992 | Guilbert | |
| 5,192,006 | A | | 3/1993 | Van Brocklin et al. | |
| 5,209,362 | A | | 5/1993 | Lutzker | 215/225 |
| 5,299,703 | A | * | 4/1994 | Cater | 215/274 |
| 5,303,835 | A | * | 4/1994 | Haber et al. | 215/247 |
| 5,314,084 | A | | 5/1994 | Folta et al. | 215/249 |
| 5,348,174 | A | | 9/1994 | Velicka | |
| 5,562,219 | A | | 10/1996 | de Pous et al. | |
| 5,642,908 | A | | 7/1997 | Mascitelli | |
| 5,692,650 | A | | 12/1997 | Wolter et al. | |
| 5,772,080 | A | * | 6/1998 | de Pous et al. | 222/153.13 |
| 5,799,810 | A | | 9/1998 | de Pous et al. | |
| 5,875,932 | A | | 3/1999 | Meshberg | |
| 5,941,428 | A | | 8/1999 | Behar et al. | |
| 6,186,359 | B1 | * | 2/2001 | de Pous et al. | 222/1 |
| 6,253,941 | B1 | | 7/2001 | VanBrocklin et al. | |
| 6,409,049 | B1 | * | 6/2002 | de Pous et al. | 222/153.09 |

FOREIGN PATENT DOCUMENTS

| | | | | |
|---|---|---|---|---|
| AT | 189528 | | 5/1956 | |
| BE | 545477 | | 3/1956 | |
| CA | 1090299 | | 11/1980 | 210/45 |
| DE | 2307715 | | 9/1973 | |
| DE | 76 07 195 | | 2/1976 | |
| DE | 27 08 530 | | 2/1977 | |
| DE | 2708530 | | 8/1978 | |
| DE | 2802062 | | 8/1978 | |
| DE | 2721387 | | 11/1978 | |
| DE | 2906308 | | 8/1980 | |
| EP | 290431 | | 9/1986 | |
| EP | 0 806 248 | A1 | 11/1997 | |
| FR | 1262580 | | 4/1961 | |
| FR | 72.31106 | | 3/1974 | |
| FR | 74.27551 | | 4/1975 | |
| FR | 79.06359 | | 10/1980 | |
| FR | 81 12102 | | 12/1982 | |
| FR | 2 534 557 | | 4/1984 | |
| FR | 82.17425 | | 4/1984 | |
| FR | 77.38334 | | 10/1984 | |
| GB | 239215 | | 4/1926 | |
| GB | 722642 | | 1/1955 | 125/1 |
| GB | 800043 | | 8/1958 | 125/3 |
| GB | 910686 | | 11/1962 | |
| GB | 1435190 | | 5/1976 | |
| GB | 1442433 | | 7/1976 | |
| GB | 1455104 | | 11/1976 | |
| GB | 2028779 | A | 3/1980 | |
| GB | 1571738 | | 7/1980 | |
| GB | 2063834 | A | 6/1981 | |
| IT | 549372 | | 2/1956 | |
| IT | 549372 | | 10/1956 | |
| JP | 54-28709 | | 7/1977 | |
| WO | 88/10221 | | 6/1988 | |
| WO | WO88/02297 | | 7/1988 | |
| WO | WO93/09036 | | 5/1993 | |

OTHER PUBLICATIONS

Innocos Unpublished German Patent Application Ser. No. P4338791.8, filed Nov. 12, 1993 And Entitled "A Closure Device For A Receptacle Fitted with Hand-Operable Pump" And English Translation Thereof.

Drawing Sheet 3 of 3 only from GB Patent Specification No. 117 (Jan. 4, 1892).

Search Report attached to PCT/CH88/00115 (WO 88/10221 above).

Search Report attached to PCT/DE92/00887 (WO 93/09036 above).

Search Report attached to PCT/DE86/02058 (WO 88/02297 above).

Search Report attached to FR 2,378,690.

* cited by examiner

DEVICE FOR ATTACHING A DISPENSER MEMBER TO A RECEPTACLE

Matter enclosed in heavy brackets [ ] appears in the original patent but forms no part of this reissue specification; matter printed in italics indicates the additions made by reissue.

*This is a reissue of U.S. Pat. No. 6,543,648, issued on Apr. 8, 2003 from U.S. patent application Ser. No. 10/136,211, filed May 1, 2002.*

This is a continuation of U.S. patent application Ser. No. 09/654,018, filed Sep. 1, 2000 now U.S. Pat. No. 6,409,049, which is a continuation of U.S. patent application Ser. No. 09/099,684, filed Jun. 18, 1998, now U.S. Pat. No. 6,186,359, issued Feb. 13, 2001, which is a divisional of U.S. patent application Ser. No. 08/725,934, filed Oct. 7, 1996, now U.S. Pat. No. 5,799,810, issued Sep. 1, 1998, which is a divisional of U.S. patent application Ser. No. 08/311,041, filed Sep. 22, 1994, now U.S. Pat. No. 5,562,219, issued Oct. 8, 1996.

The present invention relates to a device for attaching, and to a method for attaching, a dispenser member, such as a pump or a valve, to the neck of a receptacle containing a substance to be dispensed.

BACKGROUND OF THE INVENTION

It is known that a dispenser or dispenser member can be attached or fixed to the neck of a receptacle by means of a collar or ring in a way that does not require crimping and thus facilitates assembly of the device.

In known techniques (e.g., U.S. Pat. No. 2,723,773 issued to E. Greene in 1955), a fixing ring or attaching ring of the "snap-fastening" type is placed on the body of a dispenser member and is snap-fastened to the neck of the receptacle, generally by means of snap-fastening tabs provided for that purpose. A cup, hoop, or band is then engaged around the collar or ring to hold the collar or ring securely to the neck of the receptacle.

In order to have an inexpensive and simple assembly, it is typically necessary to effect both the snap-fastening of the ring and the engagement of the hoop mechanically by means of a single, automatic assembly machine. The assembly machine exerts sufficient force on the hoop so that the ring is first snap-fastened on the neck of the receptacle and so that the hoop is also subsequently fully engaged around the ring.

Conventional attachment devices suffer from certain drawbacks. In particular, when the force exerted on the hoop is not uniformly distributed around its periphery, there is a risk of the hoop being forced away from its vertical position in the assembly machine so that the hoop becomes cocked or slanted and engaged obliquely on the fixing ring, thereby preventing proper overall assembly.

SUMMARY OF THE INVENTION

An object of the present invention is to avoid that drawback by providing an attaching ring or fixing ring that ensures effective and reliable engagement with the hoop.

The present invention provides an attaching ring or a fixing ring for attaching or fixing a dispenser member on a neck of a receptacle containing a substance to be dispensed. The fixing ring is annular and comprises a bottom portion and a top portion. The bottom portion includes attaching means or fixing means for fixing the ring to the neck. The top portion includes an opening for the dispenser member as well as means for securing the dispenser member on the container neck.

The top portion further includes at least one guide wall element extending vertically parallel to the longitudinal axis of the dispenser member and around the periphery of the fixing ring substantially in line with the fixing means of the bottom portion. This guide wall element guides the hoop during installation and facilitates proper engagement of the components.

In a preferred embodiment of the ring, the fixing means are snap-fastening means. Most preferably, the snap-fastening means are in the form of tabs.

In the preferred embodiment of the ring, the guide wall elements form a continuous, guiding, annular crown.

The fixing ring is adapted to be threaded around, or otherwise mounted to, the head of a dispenser member. A fixing ring made in accordance with the invention also has the advantage of accommodating partial installation of a cup or hoop partway on the fixing ring which has been mounted to the dispenser member. The hoop can be disposed on the ring around the guide wall elements prior to being delivered to the customer. The customer then merely has to fill the receptacle with the chosen substance and place the subassembly or unit formed by the dispenser member, the fixing ring, and the hoop in the assembly machine. The assembly machine mounts the pre-assembled subassembly or unit on the receptacle to engage the fixing means with the receptacle neck and subsequently pushes the hoop down relative to the ring to effect final assembly of the hoop in a fully engaged position around the ring.

The guide wall elements effectively eliminate, or at least minimize, the likelihood of separation of the hoop from the fixing ring during delivery to the customer (e.g., when separation forces are imposed on the components due to vibration in transport). The guide wall elements also ensure that the hoop is correctly positioned for initial engagement by the assembly machine and for accommodating subsequent full engagement with the ring in the final assembly configuration.

Preferably, the guide wall elements have an outside diameter that is approximately equal to the inside diameter of the hoop, thereby enabling the hoop to be slidably engaged with the ring so that the frictional engagement prevents easy separation.

Another aspect of the invention provides a multi-component attaching device or fixing device for fixing a dispenser member to the neck of a receptacle containing a substance to be dispensed. In the preferred form, the multi-component device includes two components. The device includes an annular fixing ring provided with snap-fastening means designed to snap-fasten to the neck of the receptacle. The device also includes an annular hoop with an inside diameter substantially equal to the outside diameter of the fixing ring and which is adapted to be mounted on the fixing ring in a force fit (i.e., by means of a force fit, such as a press fit) to prevent the snap-fastening means from splaying apart.

The ring of the multi-component device comprises a bottom portion and a top portion. The bottom portion includes the snap-fastening means for snap-fastening to the receptacle neck. The top portion includes an opening for the dispenser member and means for holding the dispenser member securely to the neck. The top portion further includes at least one guide wall element extending vertically parallel to the longitudinal axis of the dispenser member around the periphery of the fixing ring and substantially in line with the snap-fastening means of the bottom portion.

To obtain effective assembly of the fixing ring and of the hoop with a single assembly machine, it is essential for the ring to be completely snap-fastened on the neck of the receptacle before the hoop is fully engaged with the ring in the final position.

Generally, this problem is solved by providing an initial friction fit between the ring and the hoop in an initial, non-final position wherein the force of the initial frictional engagement is greater than the force required to initially snap-fasten the ring on the neck of the receptacle.

By exerting enough force on the hoop, it is thus possible to first snap-fasten the ring on the neck of the receptacle, and subsequently move the hoop from its initial position completely down over the ring to a final position. However, as conventionally effected, this technique suffers from the drawback that the relative dimensions of the ring and of the hoop must be accurately defined so that the friction force between them is always the same.

Unfortunately, for manufacturing reasons, those dimensions are likely to vary somewhat, and as a result, proper assembly is not guaranteed. It is essential for the ring to snap-fasten before the hoop is positioned around snap-fastening means thereon, and that may not occur if the resistance to snap-fastening is too great or if the friction between the ring and the hoop is too small.

In a system described in German patent application No. P43 38 791.8, one or more outwardly projecting pins are provided on the outside circumference of the snap-fastening ring. The bottom of the hoop initially bears against them. When a downward force is applied to the hoop, the hoop and ring move down together in this pre-assembly configuration. The ring, while being driven downwardly by the hoop engaging the ring pins, is caused to snap-fasten onto the receptacle before the pins are broken or inwardly deformed by the effect of a subsequent greater installation force which allows the hoop to be moved down on the ring and fully engaged around the ring. That solves the problem of tolerance of the dimensions. However, such special rings can be difficult to mold, and that increases the cost of the device.

An object of one form of the present invention is to avoid the above-identified drawbacks by providing a snap-fastening ring and a hoop that are easy to mold, that can be assembled by a single assembly machine, and that facilitate effective assembly independently of dimensional tolerances, thereby making it possible significantly to reduce the manufacturing costs of a dispenser.

One form of the present invention therefore provides a further improved, multi-component fixing device for attaching or fixing a dispenser member to the neck of a container or other receptacle containing a substance to be dispensed. The device includes an annular fixing ring provided with snap-fastening means designed to snap-fasten to the neck of the receptacle.

The device also includes an annular hoop which has an inside diameter that is substantially equal to the outside diameter of the fixing ring. The hoop is adapted to be engaged in a force fit (i.e., by means of a force fit, such as a press fit) on the fixing ring to prevent the snap-fastening means from splaying apart.

The fixing ring comprises a bottom portion and a top portion. The bottom portion includes the snap-fastening means for engaging the neck. The top portion includes an opening for the dispenser member and means for holding it securely to the neck. The top portion further includes at least one guide wall element extending vertically parallel to the longitudinal axis of the dispenser member around the periphery of the fixing ring substantially in line with the snap-fastening means of the bottom portion.

The hoop has an annular side wall. The hoop includes at least one projection on the inside face of its side wall which extends vertically over at least a fraction of the height of the side wall. The inside diameter of the hoop at the projection is slightly less than the outside diameter of the fixing ring. Preferably, the projection is in the form of a rib. In one embodiment, the rib can be defined by the convex side of an indentation formed in the side wall.

For delivery purposes, the hoop can initially be pre-engaged partway on the ring—on the guide wall of the fixing ring—with the bottom end of the projection abutting the top end of the guide wall. During final assembly, the projection pushes against the guide wall of the ring, and the ring and the hoop are initially moved together to snap-fasten the ring on the neck of the receptacle before the hoop is subsequently moved down relative to the ring and positioned around the snap-fastening elements of the ring.

Preferably, the hoop includes a plurality of projections uniformly distributed around the inside face of the side wall of the hoop.

In a preferred form, the projection extends vertically from the top end of the hoop to a point situated more than halfway down the height of the hoop.

Optionally, the projection may have the form of an annular shoulder extending horizontally around the entire circumference of the hoop.

Preferably, the hoop is made of a material that is harder than that of the fixing ring. In a preferred form, the hoop is made of metal, and the fixing ring is made of a plastic material.

In another embodiment, the invention includes a particular type of a projection on the hoop of a multi-component fixing device for attaching or fixing a dispenser member to the neck of a receptacle containing a substance to be dispensed. The fixing device includes an annular fixing ring provided with snap-fastening means designed to snap-fasten to the neck of the receptacle.

The fixing device also includes an annular hoop which has an inside diameter that is substantially equal to the outside diameter of the fixing ring. The hoop is adapted to be engaged in a force fit with the fixing ring to prevent the snap-fastening means from splaying apart.

The fixing ring comprises a bottom portion and a top portion. The bottom portion includes the snap-fastening means for snap-fastening to the neck. The top portion includes an opening for the dispenser member and means for holding it securely to the neck. The top portion further includes at least one guide wall element extending vertically parallel to the longitudinal axis of the dispenser member around the periphery of the fixing ring substantially in line with the snap-fastening means of the bottom portion.

The hoop includes at least one projection on the inside face of its side wall. The projection extends obliquely over at least a fraction of the height of the side wall. The inside diameter of the hoop at the projection is slightly less than the outside diameter of the fixing ring.

Preferably, the projection is a rib. The rib may be defined by the convex side of an indentation formed in the hoop side wall.

The use of the obliquely oriented projection advantageously facilitates separation of the hoop (which is typically made of metal) from the fixing ring (which is typically made of a plastic material) by unscrewing the hoop. This is of particular advantage for selective recycling of the different component materials from which the dispenser is made.

The present invention also provides a method of attaching or fixing a dispenser member to the neck of a container or other receptacle containing a substance to be dispensed. The method comprises the following steps:

(1) placing an annular attaching ring or fixing ring on the dispenser member, the annular fixing ring being provided at one end with snap-fastening means and its opposite end with a guide wall extending in line with the snap-fastening means parallel to the longitudinal axis of the fixing ring;

(2) pre-engaging or partly engaging an annular hoop at an initial or first position on the guide wall of the fixing ring, the inside diameter of the hoop being substantially equal to the outside diameter of the fixing ring;

(3) placing a subassembly of the dispenser member, the fixing ring, and the hoop on the neck of the receptacle;

(4) exerting a first force F1 on the hoop which bears against the guide wall of the fixing ring and urges the fixing ring into further engagement with the neck of the receptacle, the snap-fastening means first splaying apart under the effect of the force F1 and subsequently snap-fastening to the neck of the receptacle as the ring moves with the hoop relative to the receptacle; and (5) exerting on the hoop a second force F2 that is greater than the first force F1, the second force F2 being sufficient to cause the hoop to move relative to the fixing ring at a final position to further engage the fixing ring in a force fit with a portion of the hoop being located adjacent the snap-fastening means, the hoop thus preventing the snap-fastening means of the fixing ring from splaying apart.

The present invention also provides another form of a method of attaching or fixing a dispenser member to the neck of a container or other receptacle having a flange and containing a substance to be dispensed. The method comprises the following steps:

(1) placing an annular attaching ring or fixing ring on the dispenser member, the fixing ring being provided at one end with snap-fastening means and at its opposite end with a guide wall extending in line with the snap-fastening means parallel to the longitudinal axis of the fixing ring;

(2) pre-engaging or partly engaging an annular hoop at an initial or first position on the guide wall of the fixing ring, the inside diameter of the hoop being substantially equal to the outside diameter of the fixing ring and the hoop being provided on the inside face of its side wall with at least one projection extending along at least a fraction of the height of the side wall, the inside diameter of the hoop at the projection being slightly less than the outside diameter of the fixing ring, the hoop being partly engaged or pre-engaged on the guide wall in the position where the bottom end of the projection of the hoop bears against the top end of the guide wall of the fixing ring;

(3) placing a subassembly of the dispenser member, the fixing ring, and the hoop on the neck of the receptacle;

(4) exerting a first force F1 on the hoop which bears against the guide wall of the fixing ring via the bottom end of the projection and which pushes the fixing ring against the neck of the receptacle, the snap-fastening means first splaying part under the effect of the force F1 prior to snap-fastening to the flange of the neck of the receptacle; and (5) exerting on the hoop a second force F2 greater than the first force F1, the second force F2 being sufficient to cause the hoop to move relative to the fixing ring to a final position so as to further engage the fixing ring in a force fit with a portion of the hoop being located adjacent the snap-fastening means, the hoop thereby preventing the snap-fastening means of the fixing ring from splaying apart.

BRIEF DESCRIPTION OF THE DRAWINGS

Other features and advantages of the present invention appear from the following description of various embodiments which are presented by way of non-limiting examples and with reference to the accompanying drawings.

In the drawings.

DETAILED DESCRIPTION OF THE PREFERRED EMBODIMENTS

In one aspect of the invention, an annular attaching ring or fixing ring is provided to attach or fix a dispenser member on the neck of a container or other receptacle containing a substance to be dispensed. Two variants or embodiments of such a fixing ring 10 are shown in FIGS. 1 and 2.

Figure 1:
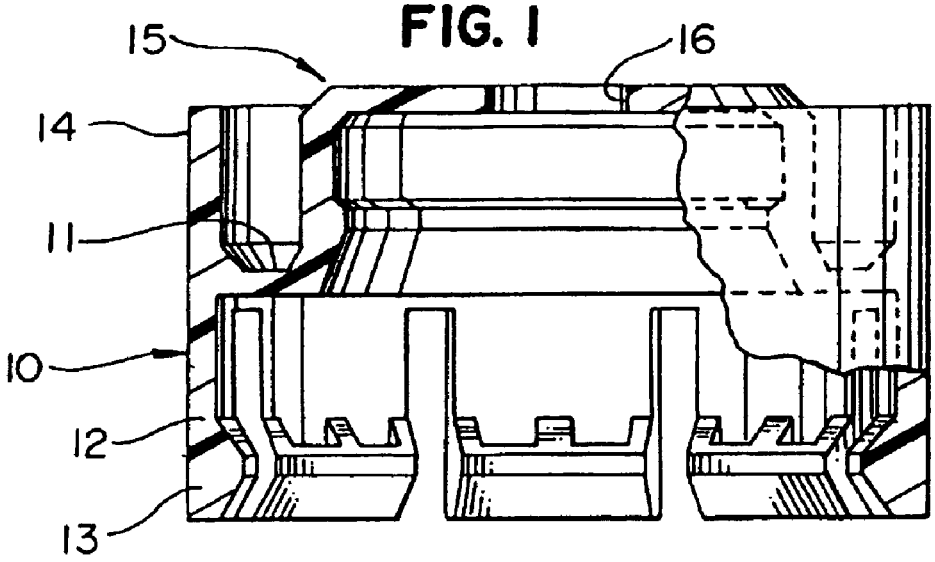
FIG. 1 is a partially sectioned elevational view of an embodiment of a fixing ring of the invention.
Figure 2:
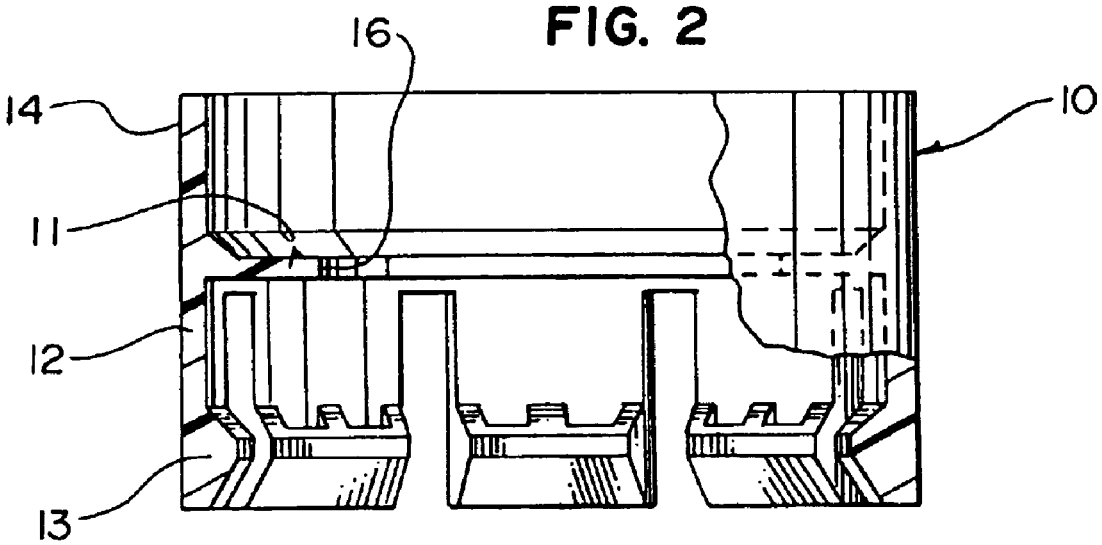
FIG. 2 is a partially sectioned elevational view of another embodiment of a fixing ring of the invention.

With reference to FIG. 1, the fixing ring 10 includes a bottom portion designed to cooperate with the neck of the receptacle and includes a top portion designed to cooperate with the dispenser member. The bottom portion includes fixing means 12, 13 for holding, engaging, or attaching the ring 10 to the neck. The means 12, 13 may be snap-fastening means. Preferably, the snap-fastening means 12, 13 include snap-fastening tabs 12 and engaging members, catches, or feet 13. The tabs 12 are preferably distributed around the circumference of the ring 10 and extend parallel to the central axis of the ring 10 (downwardly in FIGS. 1 and 2).

Each of the tabs 12 preferably includes a snap-fastening catch 13 at its bottom end that projects from the inside surface of the ring 10. Each catch 13 and tab 12 can be moved together outwardly a little when sufficient downward force is applied to the ring 10 so as to enable it to pass over, and then snap in behind, the neck of the receptacle.

The bottom portion of the ring 10 is connected to the top portion via an annular shoulder or flat 11 that extends radially inwardly relative to the central axis of the ring and that is approximately perpendicular to the tabs 12. The flat 11 can rest directly on the top surface of the neck of the receptacle, or on a sealing gasket which may be provided at that location, or on a complementary surface of the dispenser member. The flat 11 functions to hold or secure the dispenser member on (i.e., at) the neck of the receptacle.

As shown in FIG. 1 for one embodiment of the ring 10, the flat 11 may be extended towards the inside of the ring by means of a turret 15 that enables it to be securely held to a portion of the dispenser member. In the second embodiment shown in FIG. 2, such a turret is not provided.

Depending on the particular embodiment, it is either the flat 11 or the turret 15 that defines a central opening 16 through which the dispenser member extends.

In accordance with the invention, the top portion of the snap-fastening ring 10 also includes one or more guide wall portions 14 extending vertically upwardly parallel to the central axis of the ring and extending from the snap-fastening tabs 12. Advantageously, the guide wall elements can form a continuous annular guide crown 14. The guide wall element (s) 14 function to hold a cup or hoop (e.g., hoop 20 in FIG. 3) in proper alignment when such a hoop is mounted on, and slid down around, the ring 10 as described in detail hereinafter.

Figure 3:
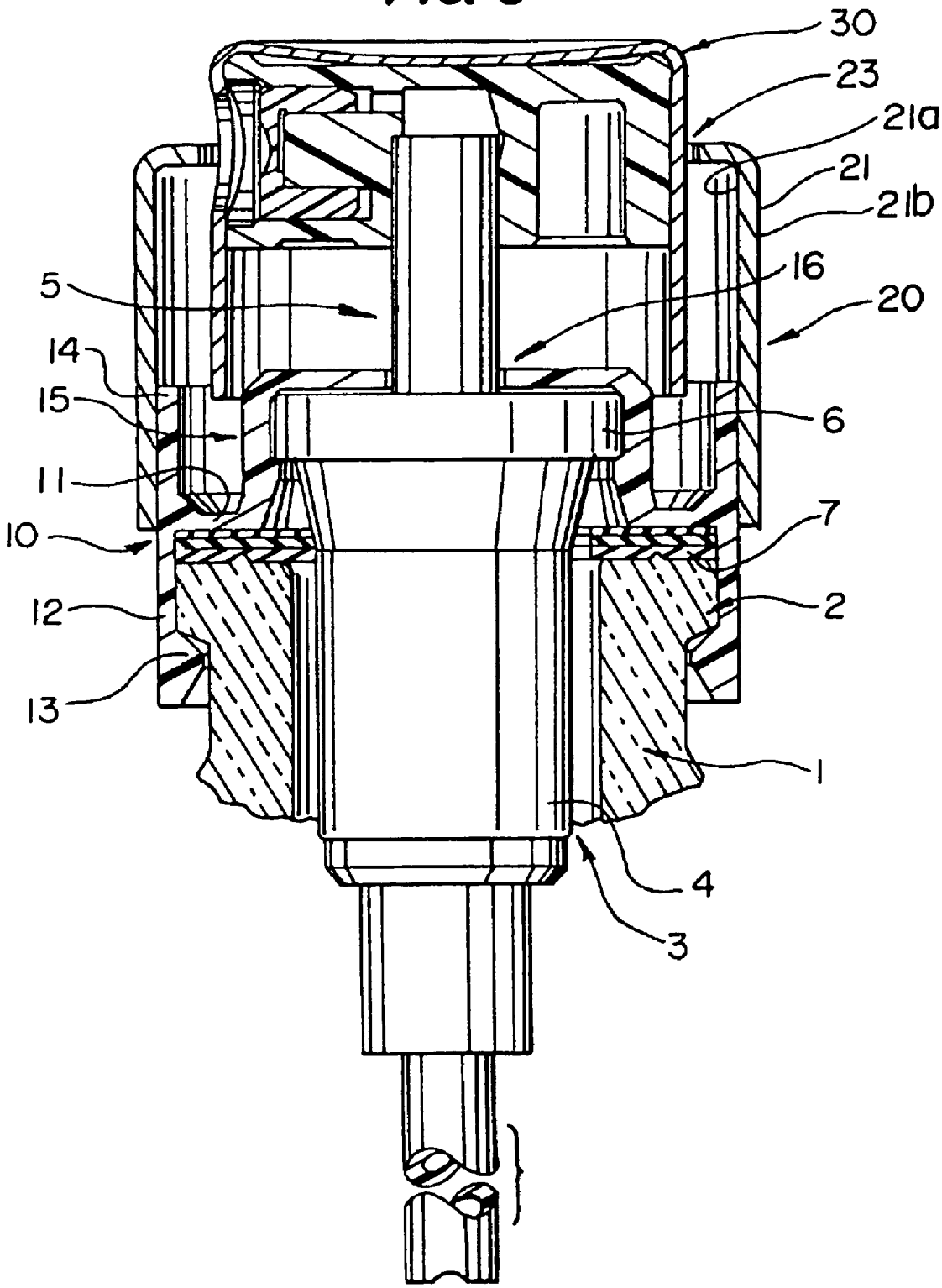
FIG. 3 is a cross-sectional view of a multi-component fixing device of the invention that includes the ring of FIG. 1 and a first form of a hoop, the device being shown with its ring in a snap-fastened position on a container flange prior to the hoop being moved further down relative to the ring to effect a final, full engagement between the hoop and ring.

In another aspect of the present invention, a multi-component device is provided for fixing a dispenser member on the neck of a receptacle containing substances to be dispensed. The device includes a fixing ring 10 as described above together with a hoop 20 (e.g., as shown in FIG. 3) that can be engaged around the tabs 12 of the ring 11 to prevent the tabs 12 from splaying apart. This secures the ring 10 firmly on the neck of the receptacle, and also secures the dispenser member thereon.

FIG. 3 illustrates a portion of a substance dispenser that includes a container or receptacle 1 having a neck or flange 2 and that includes a dispenser member 3. The member 3 has a body 4 which includes a top portion from which a dispenser head 5 extends.

The receptacle 1 is typically made of glass or of a plastic material, and its neck or flange 2 is cylindrical.

The dispenser member 3 is typically a pump or a valve, depending on the nature of the substance to be dispensed and which may be of any desired consistency.

In order to attach or fix the dispenser member 3 on (i.e., at) the neck 2 of the receptacle 1, an annular fixing ring 10, such as described above with reference to FIG. 1, can be employed. The ring 10 is placed over a top portion 6 of the body 4 of the dispenser member 3. Of course, it would also be possible to use the ring 10 as shown in FIG. 2 or any other similar ring.

The dispenser member 3 in FIG. 3 is held on the neck 2 by means of the shoulder or flat 11 and by means of the turret 15. The dispenser head 5 extends through the opening 16. Optionally, a sealing ring 7 can be provided between the top surface of the neck 2 and the bottom surface of the flat 11 of the fixing ring 10.

As described above, the fixing ring or snap-fastening ring 10 includes one or more guide wall elements 14 that may preferably be provided in the form of an annular guide crown 14.

The annular hoop 20 is designed to accommodate a forced engagement or force fit with the ring 10 for the purpose of preventing the snap-fastening tabs 12 from splaying apart. The hoop 20 has an annular side wall 21 with an inside surface 21a and an outside surface 21b. The hoop 20 can be initially mounted partway on the ring 10. In particular, a portion of the hoop 20 can be engaged with, or placed on, the annular crown 14. The hoop 20 includes an opening 23 at its top end to receive an actuator button or plug 30 that is mounted on the head 5 of the dispenser member 3.

Preferably, the outside diameter of the guide crown 14 (or plural guide wall elements, if employed) is substantially identical with the inside diameter of the side wall of the hoop 20. As a result, the hoop 20 can slide in a friction fit over the guide crown 14 to a partially engaged or pre-assembled position on the ring 10 as shown in FIG. 3. In such an initial configuration, the subassembly of the dispenser member 3, ring 10, and hoop 20 can be supplied to an assembly machine for final assembly (i.e., installation) on the receptacle 1.

The friction between the guide crown 14 and the hoop 20 prevents these two parts from separating during delivery to the customer who uses the assembly machine to effect final assembly on the receptacle 1. In addition, because the guide crown 14 extends substantially in line with the snap-fastening tabs 12, the hoop 20 will engage the circumference of snap-fastening tabs 12 in a straight relationship and will not become cocked on the tabs 12.

To achieve effective assembly and fixing of the dispenser member 3 on the neck 2 of the receptacle 1 using a single assembly machine, the hoop 20 must not begin to reach its fully lowered, final engagement position around the tabs 12 prior to the tabs 12 snap-fastening beneath the neck 2. (The fully engaged, final position of the hoop 20 for the embodiment of the exact device shown in FIG. 3 is not illustrated, but such a final position is analogous to the position shown for the hoop 20 in an alternate form of the device shown in FIG. 4c.)

The final engagement of the components can be facilitated by employing another aspect of the invention as shown in FIGS. 4a to 12. Specifically, the hoop 20 can be provided with at least one projection 22, 24 (projection 22 in FIGS. 4a, 4b, 4c, 5-7, 11, and 12; and projection 24 in FIGS. 8a, 8b, 9, and 10). The projection is on the inside face 21a of the annular side wall 21 of the hoop 20. The projection occupies a fraction of the height of the side wall 21. The inside diameter of the hoop 20 over the projection 22 or 24 is slightly less than the outside diameter of the ring 10.

Figure 11:
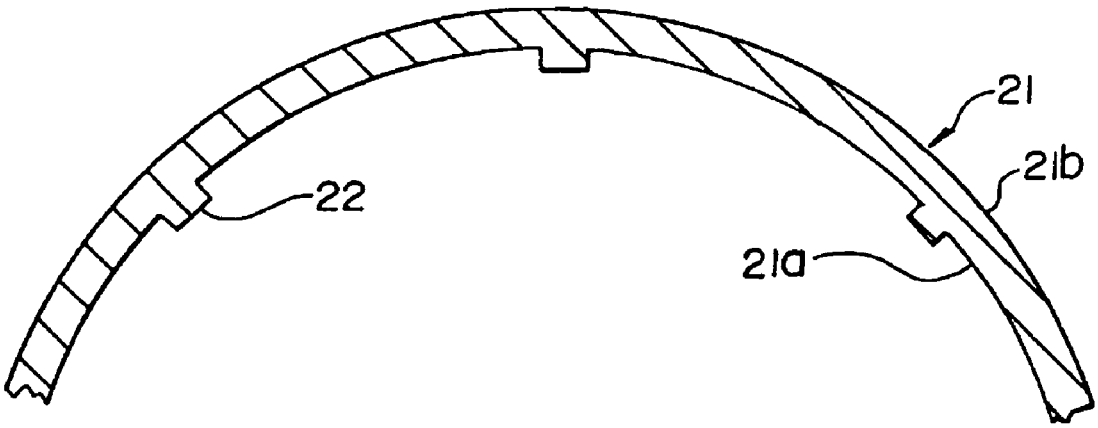
FIGS. 11 and 12 are greatly enlarged, fragmentary, cross-sectional views of the two forms of the hoop shown in FIGS. 4a and 5, respectively.
Figure 12:
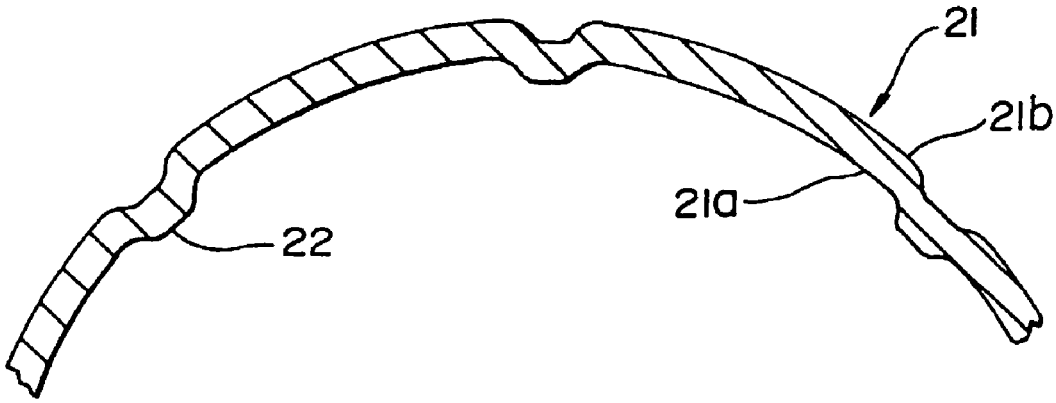

As shown for an embodiment in FIGS. 11 and 12, the projection 22 may have the form of a rib. The projection 22 may be a solid rib (e.g., as shown in FIG. 11 for projection 22) or may be a rib defined by the convex side of an indentation formed in the side wall (e.g., as shown in FIG. 12 for projection 22). When solid ribs are used (FIG. 11), the outside surface 21b of the hoop 20 remains perfectly cylindrical, and this may constitute an advantage from the point of view of appearance.

Figure 4A:
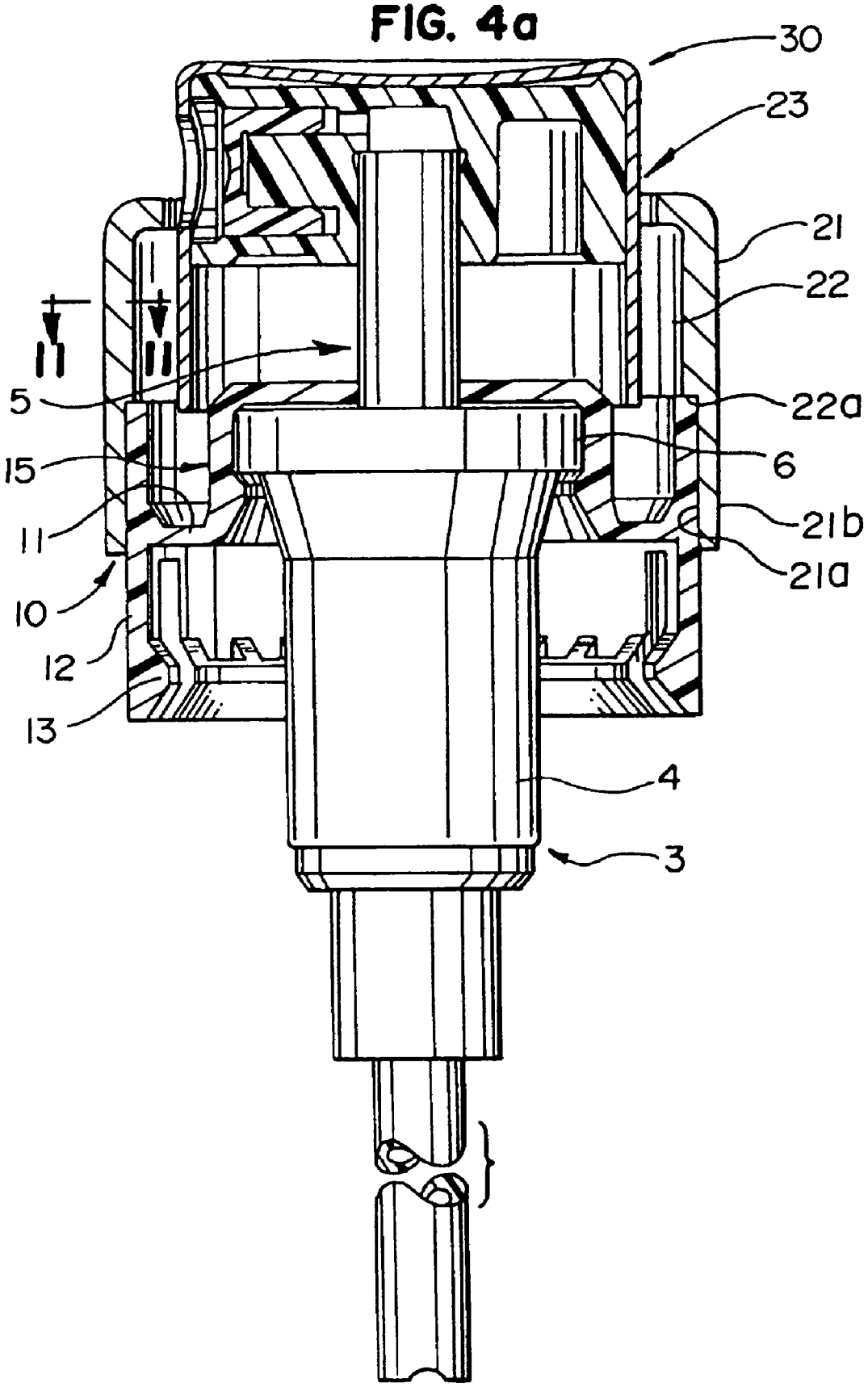
FIG. 4a is a cross-sectional view of a fixing device of the invention including the ring of FIG. 1 and a second form of the hoop, the device being shown in a position on a dispenser member forming a subassembly that is suitable for delivery to a customer and in which the hoop is pre-engaged with, or mounted partway on, the ring which is mounted to the dispenser member.
Figure 4B:
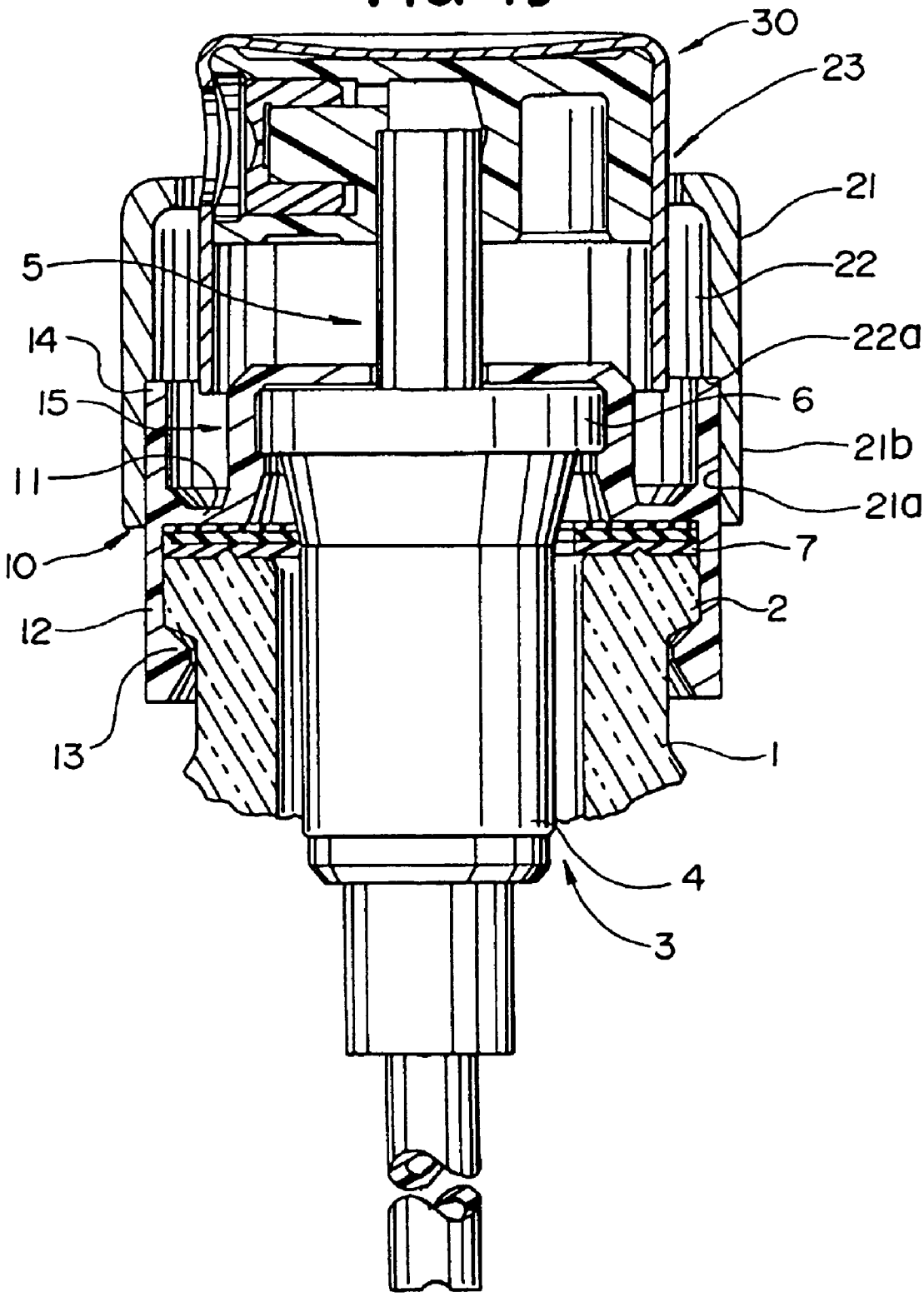
FIG. 4b is a cross-sectional view of the device of FIG. 4a after the ring has been snap-fastened onto the neck of a receptacle and prior to establishing the final, full engagement or complete engagement between the hoop and the ring.
Figure 4C:
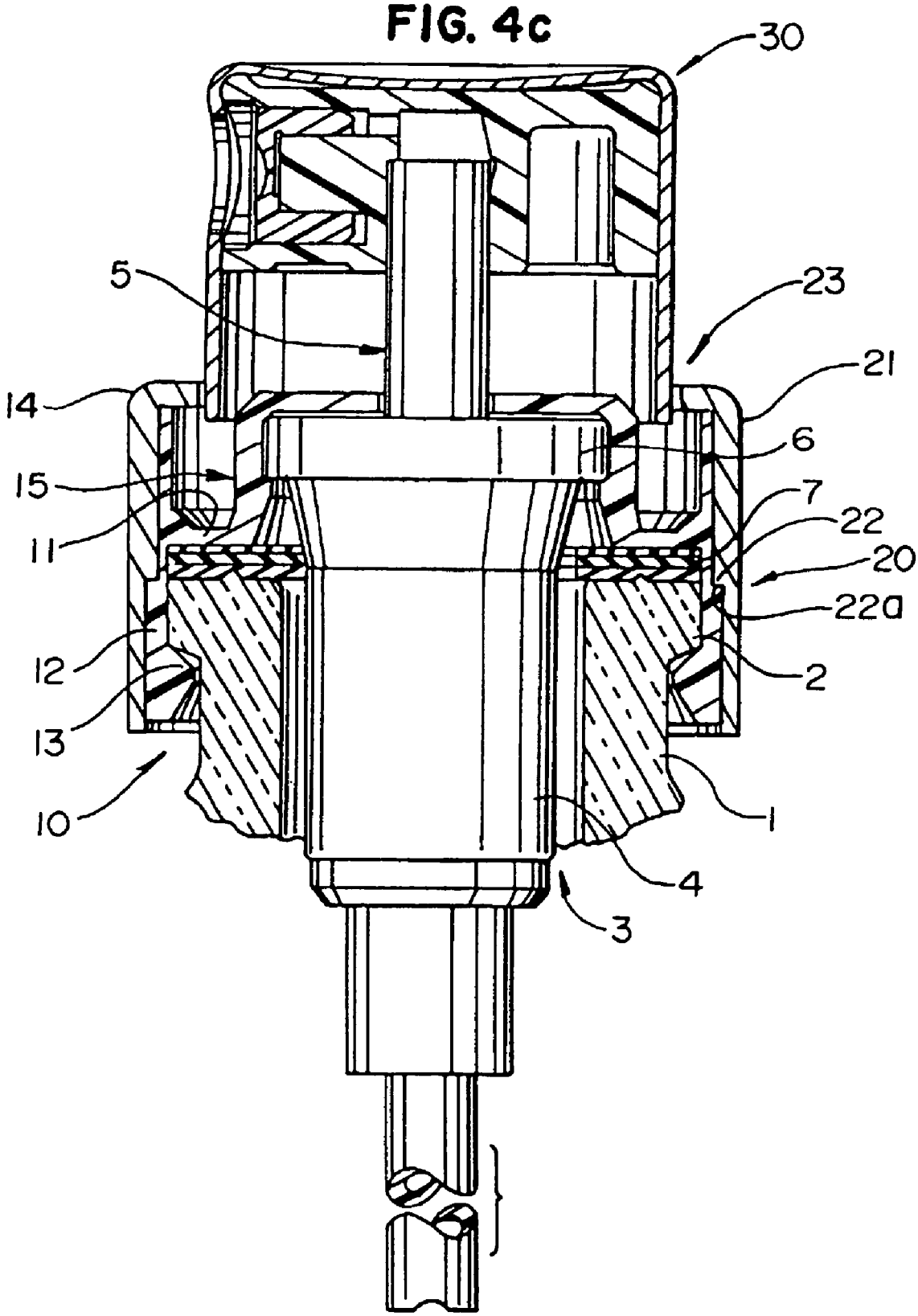
FIG. 4c is cross-sectional a view of the device of FIG. 4b in the final assembly position after the hoop has been fully engaged with the ring.
Figure 5:
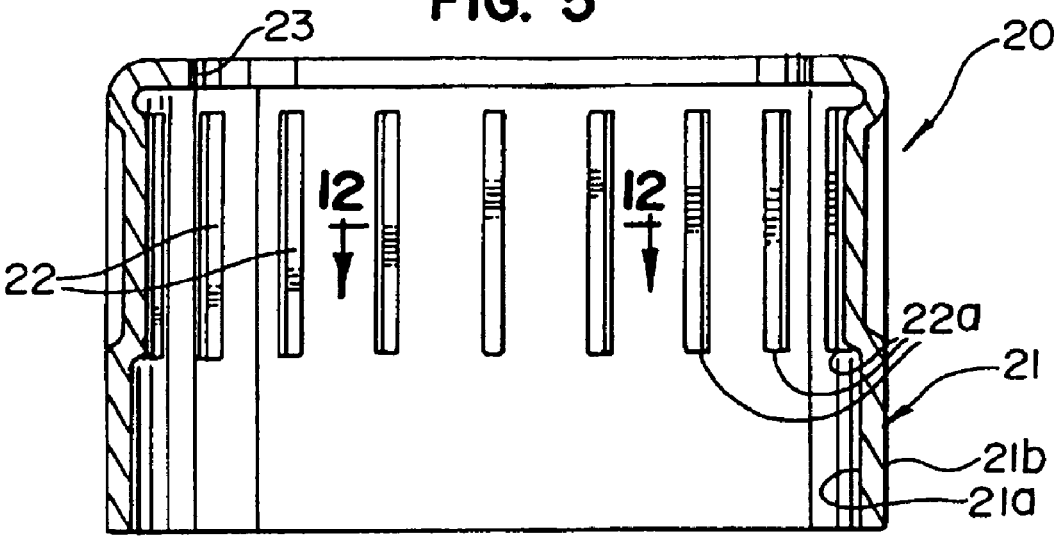
FIG. 5 is a cross-sectional view of a third form of the hoop, and this form could also be employed in the device shown in FIGS. 4a-4c.
Figure 6:
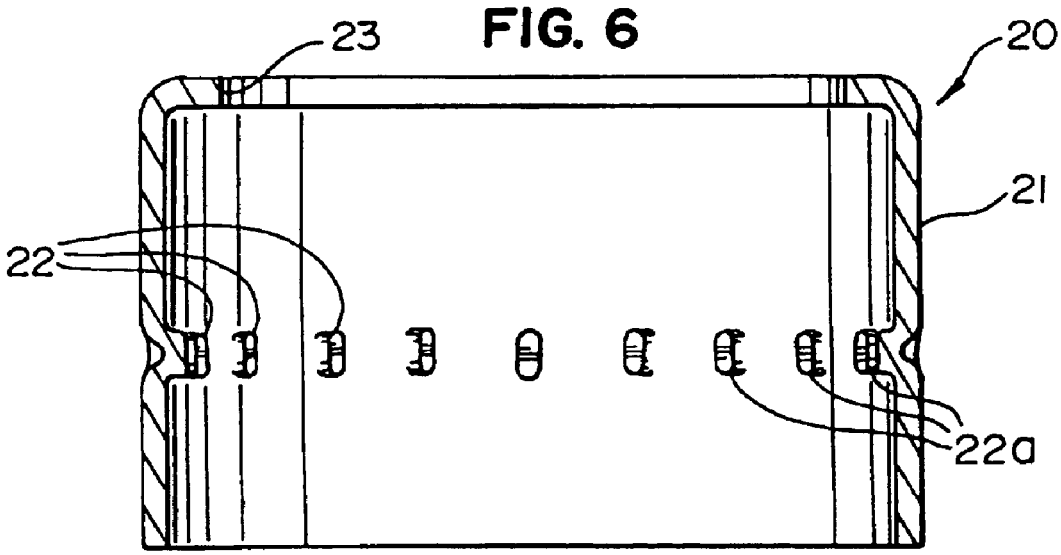
FIG. 6 is a view similar to FIG. 5, but FIG. 6 shows a fourth form of the hoop.

In the embodiments of the hoop as shown in FIGS. 4a-6, 11, and 12, the projections 22 extend vertically up the side wall 21. Preferably, the hoop 20 includes a plurality of such projections 22 that are regularly distributed around the inside face 21a of the side wall 21, as in the embodiments illustrated in FIGS. 4a, 4b, 4c, 5, 6, 11, and 12. Preferably, as shown in FIGS. 4a and 5, the projections 22 extend from the top end of the hoop 20 to at least halfway down the hoop 20. Preferably, when a plurality of projections is provided, all of the projections are identical.

Figure 7:
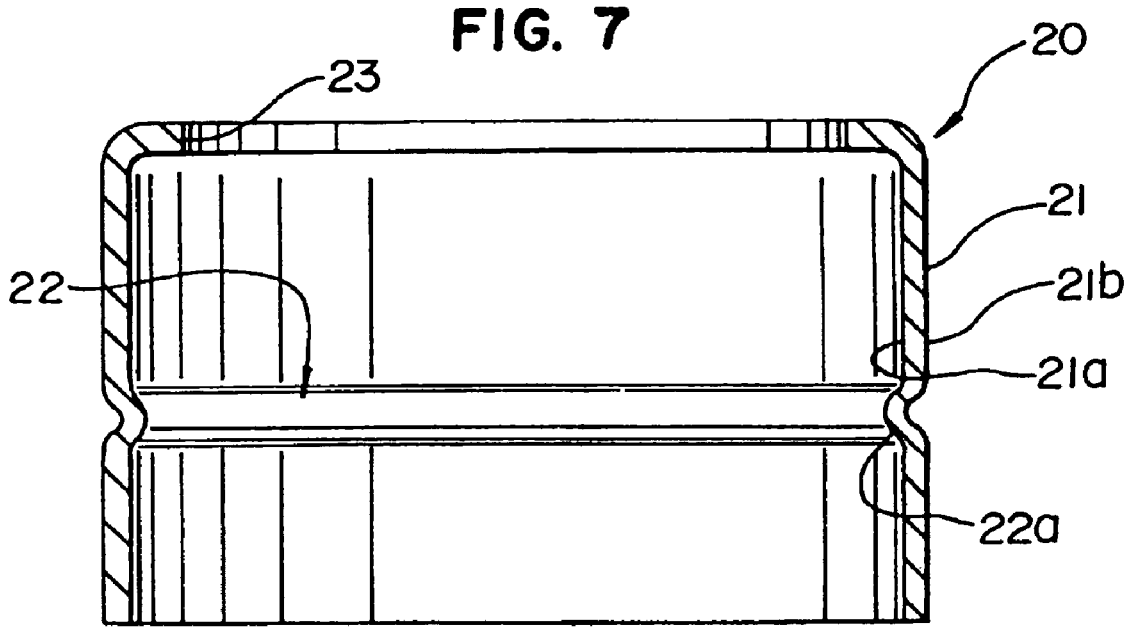
FIG. 7 is a view similar to FIG. 5, but FIG. 7 shows a fifth form of the hoop.
Figure 8A:
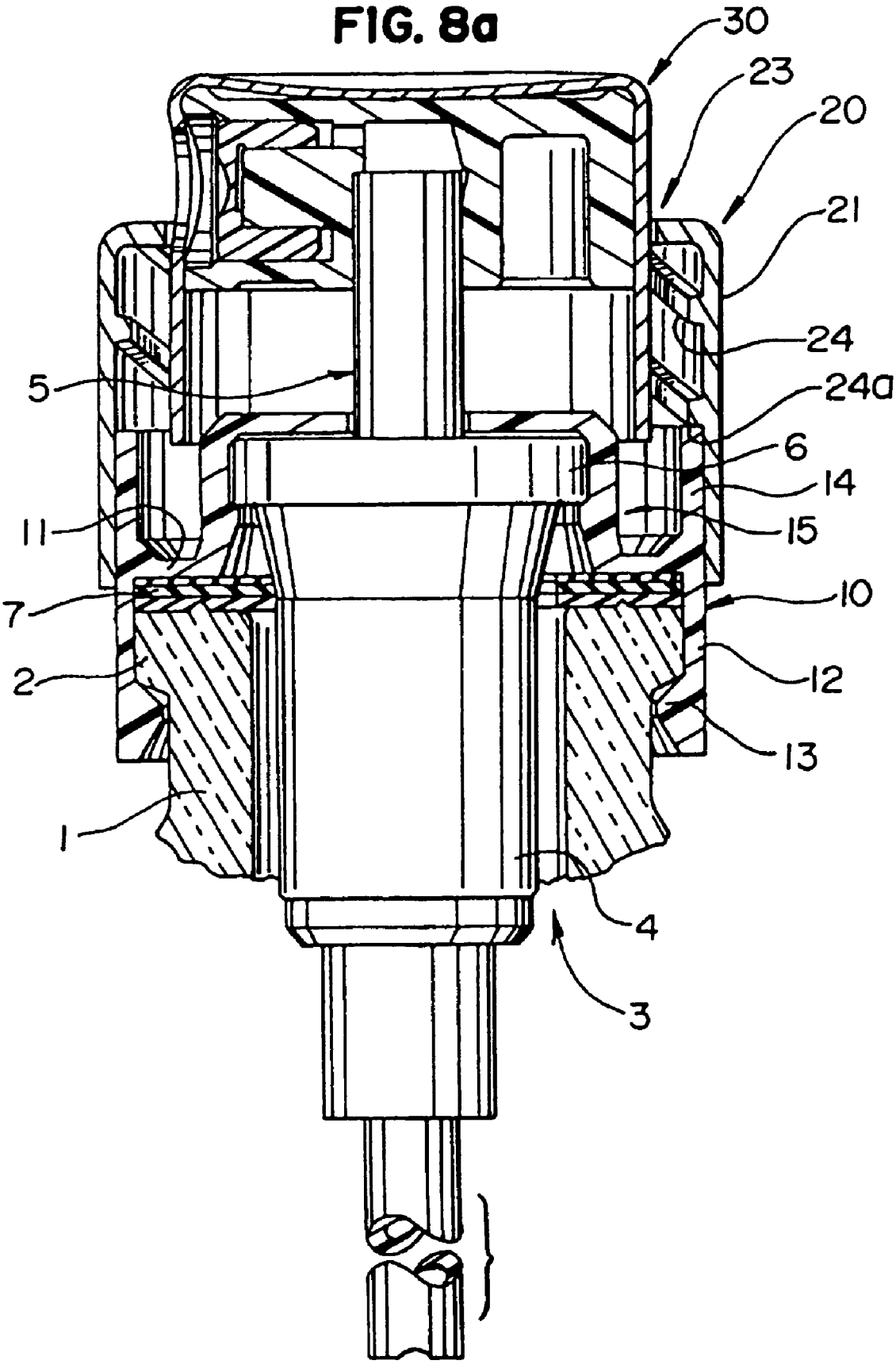
FIG. 8a is a cross-sectional view of a fixing device of the invention incorporating the ring of FIG. 1 and a sixth form of the hoop, the device being shown in its position where the ring has been snap-fastened and where the hoop is mounted in an initial position partway on the ring, but prior to the final or complete engagement between the hoop and the ring.
Figure 8B:
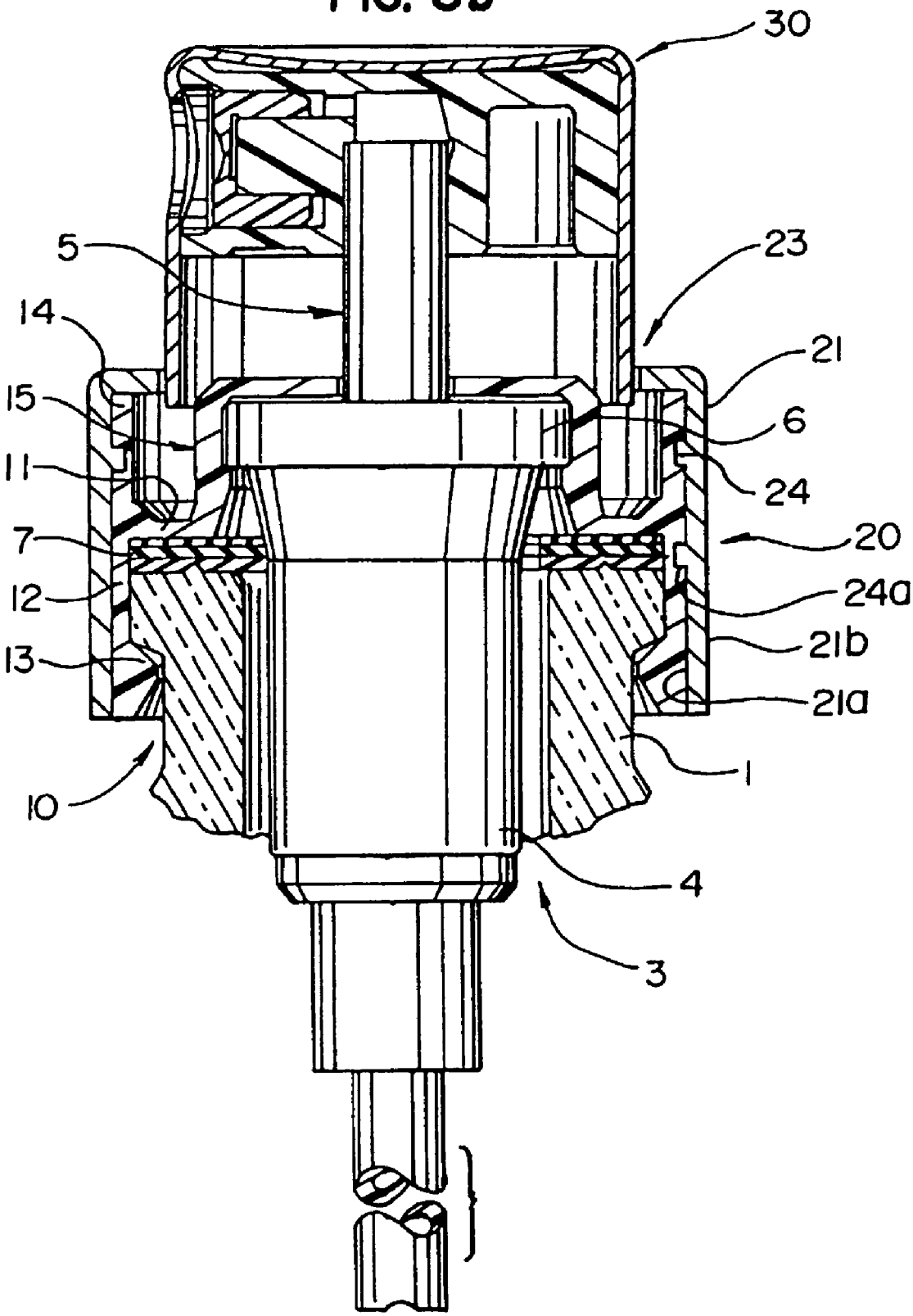
FIG. 8b is a cross-sectional view of the device of FIG. 8a after the hoop has been moved further down relative to the ring to the final position where the hoop is fully engaged with the ring.

In another embodiment, shown in FIG. 7, the projection 22 is an annular shoulder extending horizontally around the entire inner circumference of the hoop 20.

In the embodiments of the hoop shown in FIGS. 8a to 10, the projections 24 are slanted and extend obliquely along the side wall 21. Preferably, the oblique projection 24 is elongate in shape so as to form an internal thread on the annular side wall 21 of the hoop 20.

The oblique forms of the projections are particularly advantageous when the ring 10 is made of a plastic material while the hoop 20 is made of metal. After some length of time that depends on the hardness of the plastic material constituting the ring 10, the ring material cold flows or creeps to match or conform to the shape of the projection 24 of the hoop 20.

Subsequently, the oblique projection(s) 24, which form a partial or complete inside thread on the side wall 21 of the hoop 20, permit the hoop 20 to be removed from the ring 10 merely by unscrewing the hoop 20 from the ring 10 once the dispenser is no longer in use. It is therefore possible to separate components made of plastic materials from components made of metal for the purpose of performing selective recycling.

Figure 10:
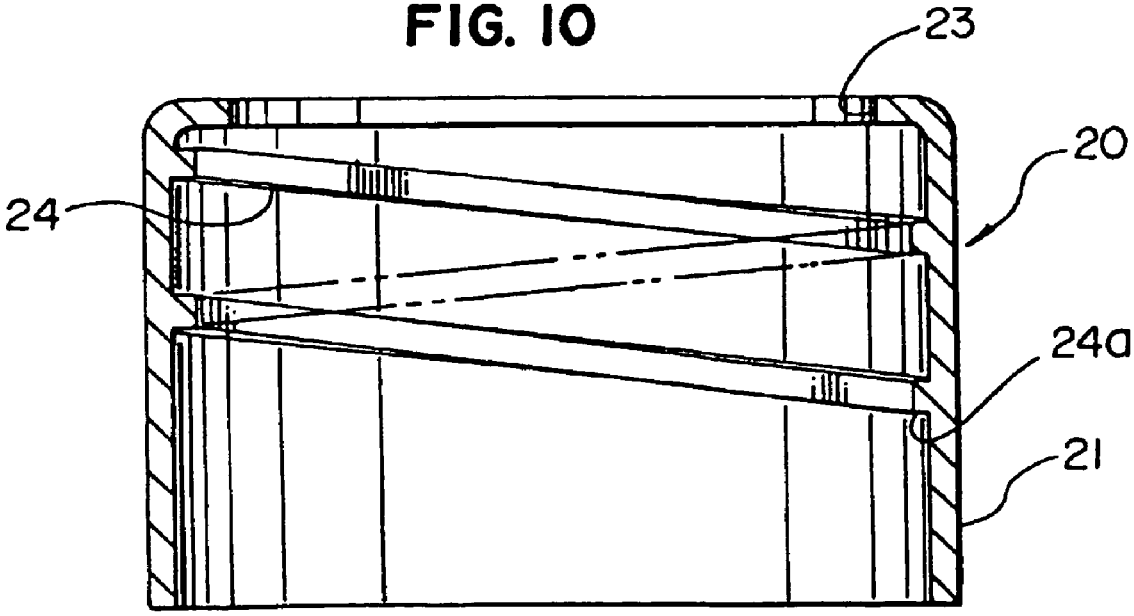
FIG. 10 is a cross-sectional view similar to FIG. 9, but FIG. 10 shows a seventh form of the hoop.

In a variant shown in FIG. 10, the inside face of the side wall 21 of the hoop 20 includes only one projection 24. Advantageously, that one oblique projection 24 occupies about one full turn of the circumference of the side wall 21. It is clear that under such circumstances, the slope of the projection 24 is relatively shallow.

Figure 9:
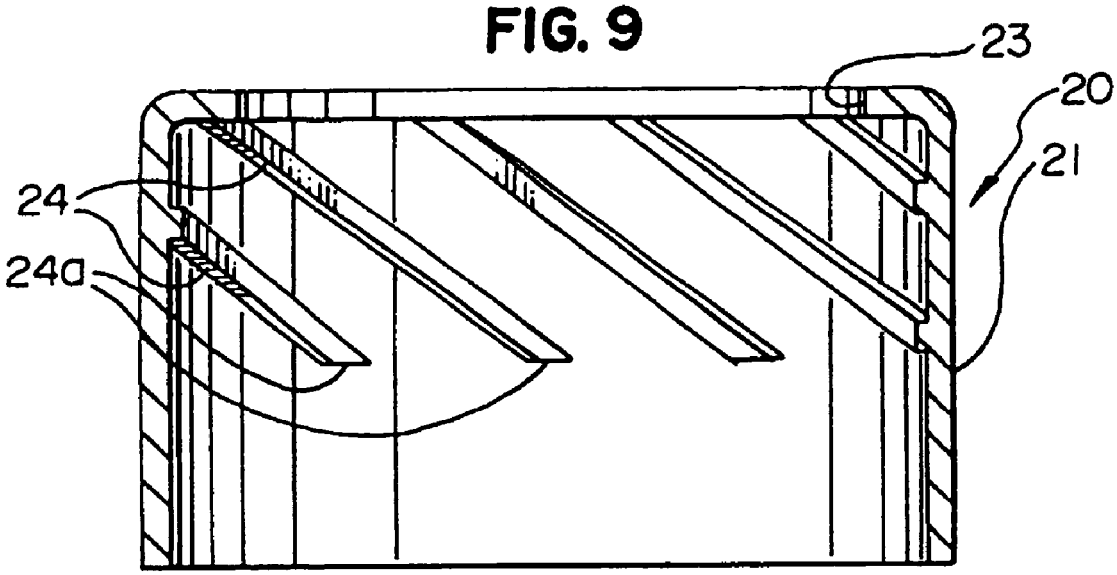
FIG. 9 is a cross-sectional view of the hoop employed in the embodiment of the device shown in FIGS. 8a and 8b.

In another variant shown in FIG. 9, the inside face of the annular side wall of the hoop is provided with a plurality of parallel, oblique projections 24 which are preferably uniformly distributed around the inner circumference of the side wall.

The method or operation of attaching or fixing the device is next briefly described with reference to FIGS. 4a to 4c which illustrate the form of the hoop 20 that has vertical projections 22. However, it will be appreciated that the device operates in identical manner with a hoop having one or more oblique projections (such as in the hoops 20 illustrated in FIGS. 8a, 8b, 9, and 10).

First, the fixing ring 10 is threaded around, or otherwise disposed on, the head 5 of the dispenser member 3. The ring 10 is fixed or retained on the head 5 by means of the turret 15 engaging the top portion 6 of the body 4 of the dispenser member 3.

The hoop 20 is then mounted partway on the ring 10. In particular, the hoop 20 placed around the guide wall element (s) 14 that preferably form an annular crown on the fixing ring 10. The hoop is pushed down on the ring 10 until the bottom ends 22a of the projections 22 abut the top end of the annular crown 14 of the fixing ring 10. This forms a subassembly constituted by the dispenser member 3, the ring 10, and the hoop 20. FIG. 4a shows the subassembly in its pre-engaged, non-final configuration, and it is in this configuration that the assembly is delivered to the customer. The customer then needs merely to fill the receptacle 1 with the chosen substance and to install the subassembly (dispenser member 3, ring 10, and hoop 20) on the receptacle 1 with a single assembly machine (not shown).

In those applications where a gasket 7 is employed, the gasket 7 is disposed around the top of the receptacle flange 2. The body 4 of the dispenser member 3 is then inserted into the neck of the receptacle 1 so that the snap-fastening tabs 12 initially rest against the sealing gasket 7 on the top surface of the neck 2 of the receptacle 1.

The assembly machine applies a first vertical thrust force F1 to the hoop 20. Because the inside diameter of the hoop 20 around its projections 22 is less than the outside diameter of the fixing ring 10, the hoop is initially prevented from sliding down further over the ring when the force F1 is applied to the hoop 20. The force F1 is therefore transmitted by the hoop 20 to the fixing ring 10 so that the ring 10 and hoop 20 move down together on the top of the receptacle 1. The snap-fastening tabs 12 splay apart under the effect of the force F1, and the ring 10 slides down around the neck 2 of the receptacle 1 until the snap-fastening tabs 12 snap beneath the neck 2 (as can be seen in FIG. 4b). The body 4 of the dispenser member 3 is then securely held inside the receptacle 1. Sealing is provided by the sealing gasket 7.

The assembly machine continues to urge the hoop 20 downwardly. A second vertical thrust force F2 is applied to the hoop 20 by the machine. This second force F2 is greater than the first force F1 and is sufficient to force the hoop 20 further down onto the fixing ring 10 as the projections 22 temporarily deform the ring guide wall 14 to accommodate the further downward movement of the hoop 20 to the final position shown in FIG. 4c where the lower portion of the hoop is adjacent the tabs 12.

The snap-fastening tabs 12 of the fixing ring 10 are thus held in their locking position and they cannot splay apart, thus ensuring that the dispenser member 3 will remain fixed or attached to the receptacle 1.

The required difference between the forces F1 and F2 depends on the shape and size (e.g., radial thickness) of the projections 22 in the hoop 20 and also depends on the characteristics of the material of the ring 10. A sufficient radial thickness of the projections 22 makes it possible to ensure effective assembly even if the snap-fastening tabs 12 should, for manufacturing reasons, be somewhat less flexible than intended, thereby causing them to exhibit higher resistance to snap-fastening.

When the hoop 20 is preferably made of metal, it is relatively easy to force it onto the fixing ring 10 (which is typically made of a plastic material) even though the inside diameter of the hoop 20 (as measured around its projections 22) is smaller than the outside diameter of the ring 10. The projections 22 become embedded in the annular guide crown 14 of the fixing ring 10.

In the presently preferred embodiment, the lowest parts of the ribs (e.g., the bottoms 22a of the ribs 22) are above the tab snap-fastening catches 13 when the hoop 20 is in the fully assembled, final, lowest position on the fixing ring 10.

When using a ring 10 which has no projections (e.g., as shown in FIG. 3), the initial frictional engagement between the ring 10 and hoop 20 is great enough to prevent movement of the hoop 20 all the way down into full engagement around the ring 10 until after the ring 10 has been pushed onto the receptacle flange 2 and snap-fastened thereto.

What is claimed is:

1. A container and dispenser assembly comprising:

a container having a flange, said flange having an upper surface and a [generally] *substantially* cylindrical sidewall defining an outside diameter;

an annular fixing ring mounted on said flange of said container comprising a lower portion and an upper portion, said fixing ring upper portion having an upper portion height above said lower portion, said lower portion and said upper portion together defining a total height, said lower portion having a [generally] *substantially* circular-shaped interior defining a first inside diameter, said upper portion above said lower portion having a [generally] *substantially* cylindrical interior surface defining a second inside diameter substantially identical to said flange outside diameter, said upper portion having an inwardly-extending annular shoulder defining a lower surface for transferring an axial force to said flange upper surface, and having a turret extending upwardly from said shoulder, said turret defining a receiving cavity and having a central opening having a third inside diameter which is smaller than both said first inside diameter and said second inside diameter, at least a portion of the upper portion height of said fixing ring upper portion above said lower portion defining a [generally] *substantially* cylindrical exterior surface that is circumferentially continuous and that defines an outer diameter;

a dispenser member mounted in said fixing ring, said dispenser member including a pump having a body extending into said fixing ring turret in engagement therewith and having an upwardly extending dispenser head which extends upwardly through said smaller diameter central opening of said turret and which includes an actuator button;

an annular hoop mounted on said fixing ring having a central opening and comprising a bottom end, a top end, and an annular side wall having a height at least as great as the total height of said fixing ring so that said annular hoop peripherally surrounds said fixing ring preventing said lower portion of said fixing ring from splaying outwardly and maintaining said first inside diameter of said fixing ring smaller than said flange outside diameter, at least a portion of the height of said hoop annular side wall comprising a [generally] *substantially* cylindrical interior surface defining a first inner hoop diameter substantially identical with said outer diameter of said fixing ring cylindrical exterior surface above said lower portion so that frictional engagement between said hoop and said ring resists separation of said hoop from said ring, said interior surface of said hoop including a plurality of engaging structures extending along said annular side wall for engaging said fixing ring cylindrical exterior surface to increase axial resistance to separation of said hoop from said ring when oppositely directed forces are applied to said hoop and ring.

2. The assembly of claim 1 wherein said plurality of engaging structures extends obliquely along said annular side wall of said hoop.

3. The assembly of claim 1 wherein said hoop is made of metal and said fixing ring is made of plastic, and said plurality of engaging structures comprises portions of said interior surface of said hoop which define a further inner diameter of said hoop which is different from said first inner hoop diameter so that said portions increase axial resistance to separation of said hoop from said ring when oppositely directed forces are applied to said hoop and ring.

4. The assembly of claim 1 wherein said hoop is made of metal and said fixing ring is made of plastic, and said plurality of engaging structures comprises portions of said interior surface of said hoop which define a further inner diameter of said hoop which is different from said first inner hoop diameter so that said fixing ring material creeps to conform to [the] *a* shape of said portions.

5. The assembly of claim 1 wherein said plurality of engaging structures comprises a plurality of projections extending along said annular side wall, said projections defining a further inner diameter.

6. The assembly of claim 5 wherein said hoop is made of metal and said fixing ring is made of plastic so that said projections are embedded in said fixing ring.

7. The assembly of claim 5 wherein said hoop is made of metal and said fixing ring is made of plastic so that said fixing ring material creeps to conform to [the] *a* shape of said projections.

8. A substance dispenser assembly comprising:

an annular fixing ring comprising a lower portion and an upper portion, said fixing ring upper portion having an upper portion height above said lower portion, said lower portion and said upper portion together defining a total height, said lower portion having a [generally] *substantially* circular-shaped interior defining a first inside diameter, said upper portion above said lower portion having a [generally] *substantially* cylindrical interior surface defining a second inside diameter, said upper portion having an inwardly-extending annular shoulder defining a lower surface and having a turret extending upwardly from said shoulder, said turret defining a receiving cavity and having a central opening having a third inside diameter which is smaller than both said first inside diameter and said second inside diameter, at least a portion of the upper portion height of said fixing ring upper portion above said lower portion defining a [generally] *substantially* cylindrical exterior surface that is circumferentially continuous and that defines an outer diameter;

a dispenser member mounted in said fixing ring, said dispenser member including a pump having a body extending into said fixing ring turret in engagement therewith and having an upwardly extending dispenser head which extends upwardly through said smaller diameter central opening of said turret and which includes an actuator button;

an annular hoop mounted partially on said fixing ring having a central opening and comprising a bottom end, a top end, and an annular side wall having a height at least as great as the total height of said fixing ring so that when said annular hoop is mounted fully on said fixing ring said hoop will peripherally surround said fixing ring preventing said lower portion of said fixing ring from splaying outwardly and whereby said fully mounted annular hoop will maintain said first inside diameter of said fixing ring to be smaller than said second inside diameter of said fixing ring, at least a portion of the height of said hoop annular side wall adjacent said bottom end comprising a [generally] *substantially* cylindrical interior surface defining a first inner hoop diameter substantially identical with said outer diameter of said fixing ring cylindrical exterior surface above said lower portion so that frictional engagement between said hoop and said ring resists separation of said hoop from said ring, said interior surface of said hoop including a plurality of engaging structures extending along said annular side wall for engaging said fixing ring cylindrical exterior surface to increase axial resistance to separation of said hoop from said ring when oppositely directed forces are applied to said hoop and ring.

9. The assembly of claim 8 wherein said plurality of engaging structures extends obliquely along said annular side wall of said hoop.

10. The assembly of claim 8 wherein said hoop is made of metal and said fixing ring is made of plastic, and said plurality of engaging structures comprises portions of said interior surface of said hoop which define a further inner diameter of said hoop which is different from said first inner hoop diameter so that as said hoop is moved into increased longitudinal engagement with said fixing ring said portions transfer some axial load to said fixing ring.

11. The assembly of claim 8 wherein said hoop is made of metal and said fixing ring is made of plastic, and said plurality of engaging structures comprises portions of said interior surface of said hoop which define a further inner diameter of said hoop which is different from said first inner hoop diameter so that said fixing ring material will creep to conform to [the] *a* shape of said portions.

12. The assembly of claim 8 wherein said plurality of engaging structures comprises a plurality of projections extending along said annular side wall, said projections defining a further inner diameter of said hoop which is smaller than said first inner hoop diameter so that as said hoop is moved into increased longitudinal engagement with said fixing ring said projections transfer some axial load to said fixing ring.

13. The assembly of claim 12 wherein said hoop is made of metal and said fixing ring is made of plastic so that said projections become embedded in said fixing ring.

14. The assembly of claim 12 wherein said hoop is made of metal and said fixing ring is made of plastic so that said fixing ring material will creep to conform to [the] *a* shape of said projections.

15. A substance dispenser assembly comprising:

an annular fixing ring comprising a lower portion and an upper portion, said fixing ring upper portion having an upper portion height above said lower portion, said lower portion and said upper portion together defining a total height, said lower portion having a [generally] *substantially* circular-shaped interior defining a first inside diameter, said upper portion above said lower portion having a [generally] *substantially* cylindrical interior surface defining a second inside diameter, said upper portion having an inwardly-extending annular shoulder defining a lower surface and having a turret extending upwardly from said shoulder, said turret defining a receiving cavity and having a central opening having a third inside diameter which is smaller than both said first inside diameter and said second inside diameter, at least a portion of the upper portion height of said fixing ring upper portion above said lower portion defining a [generally] *substantially* cylindrical exterior surface that is circumferentially continuous and that defines an outer diameter;

a dispenser member mounted in said fixing ring, said dispenser member including a pump having a body extending into said fixing ring turret in engagement therewith and having an upwardly extending dispenser head which extends upwardly through said smaller diameter central opening of said turret and which includes an actuator button;

an annular hoop having a central opening and comprising a bottom end, a top end, and an annular side wall having a height at least as great as the total height of said fixing ring so that when said annular hoop is mounted fully on said fixing ring said hoop will peripherally surround said fixing ring preventing said lower portion of said fixing ring from splaying outwardly and whereby said fully mounted annular hoop will maintain said first inside diameter of said fixing ring to be smaller than said second inside diameter of said fixing ring, at least a portion of the height of said hoop annular side wall adjacent said bottom end comprising a [generally] *substantially* cylindrical interior surface defining a first inner hoop diameter substantially identical with said outer diameter of said fixing ring cylindrical exterior surface above said lower portion so that after said annular hoop is mounted partway on said fixing ring frictional engagement between said hoop and said ring will resist separation of said hoop from said ring, said interior surface of said hoop including a plurality of engaging structures extending along said annular side wall for engaging said fixing ring cylindrical exterior surface to increase axial resistance to separation of said hoop from said ring when oppositely directed forces are applied to said hoop and ring.

16. The assembly of claim 15 wherein said plurality of engaging structures extends obliquely along said annular side wall of said hoop.

17. The assembly of claim 15 wherein said hoop is made of metal and said fixing ring is made of plastic, and said plurality of engaging structures comprises portions of said interior surface of said hoop which define a further inner diameter of said hoop which is different from said first inner hoop diameter so that as said hoop is moved onto said fixing ring into increased longitudinal engagement with said fixing ring said portions transfer some axial load to said fixing ring.

18. The assembly of claim 15 wherein said hoop is made of metal and said fixing ring is made of plastic, and said plurality of engaging structures comprises portions of said interior surface of said hoop which define a further inner diameter of said hoop which is different from said first inner hoop diameter so that said fixing ring material will creep to conform to [the] *a* shape of said portions.

19. The assembly of claim 15 wherein said plurality of engaging structures comprises a plurality of projections extending along said annular side wall, said projections defining a further inner diameter of said hoop which is smaller than said first inner hoop diameter so that as said hoop is moved onto said fixing ring into increased longitudinal engagement with said fixing ring said projections transfer some axial load to said fixing ring.

20. The assembly of claim 19 wherein said hoop is made of metal and said fixing ring is made of plastic so that said projections become embedded in said fixing ring.

21. The assembly of claim 19 wherein said hoop is made of metal and said fixing ring is made of plastic so that said fixing ring material will creep to conform to [the] *a* shape of said projections.

*22. A fixing device for fixing a dispenser member to a neck of a receptacle containing a substance to be dispensed, comprising:*

*a fixing ring comprising a bottom portion having a fastening part structured to engage the receptacle neck and a top portion defining a receiving cavity for the dispenser member, the fixing ring defining an exterior surface; and*

*an annular hoop surrounding the fixing ring so as to prevent the fastening part from moving radially outwardly, the annular hoop having at least one projection located on an inner surface of the annular hoop, the projection extending radially inwardly, the projection being axially located at a level of the fixing ring and deforming inwardly the exterior surface of the fixing ring when the hoop is fully mounted on the ring so as to increase resistance to separation of the annular hoop from the*

*fixing ring; and wherein, when the annular hoop is fully mounted on the fixing ring, the fixing ring extends axially below the projection in the direction of the receptacle.*

*23. The fixing device according to claim 22, wherein the at least one projection is annular.*

*24. The fixing device according to claim 23, wherein the annular projection extends circumferentially and horizontally.*

*25. The fixing device according to claim 22, wherein the hoop has an outer surface that is cylindrical at a level of the projection.*

*26. The fixing device according to claim 22, wherein the hoop has an outer surface that is recessed at a level of the projection.*

*27. The fixing device according to claim 22, wherein the hoop has an upper end and a lower end, the projection being spaced from the lower end so as to define a lower hoop section having a cylindrical inner surface, an outer surface of the ring having an outer diameter substantially identical to an inner diameter of the cylindrical inner surface so that the lower hoop section is engageable on the ring with the projection abutting a top end of the ring.*

*28. A fixing device according to claim 22, wherein the hoop comprises a plurality of annular projections.*

*29. The set of components according to claim 32, wherein the at least one projection comprises at least one annular shoulder.*

*30. The set of components according to claim 29, wherein the shoulder extends circumferentially horizontally.*

*31. The fixing device according to claim 22, wherein, when the hoop is fully mounted on the ring, the ring also extends axially above the projection.*

*32. A set of components that can be assembled in an assembled state to form a substance dispenser assembly, the set comprising:*

*an annular fixing ring comprising a bottom portion and a top portion, the bottom portion having an inwardly projecting fastening part in the assembled state, the top portion defining a receiving cavity, at least a radially outermost portion of the fixing ring above the fastening part defining a substantially cylindrical exterior surface that defines an outer diameter;*

*a dispensing member structured to be mounted in the fixing ring so that the dispenser member extends into the fixing ring cavity in snap-fit engagement with the fixing ring and projects upwardly through the top portion; and*

*an annular hoop having top and bottom ends and having an annular side wall with a height that is sufficient to completely enclose the fixing ring and prevent the fastening part from moving radially outwardly when the annular hoop is mounted fully on the fixing ring, at least a portion of the height of the annular side wall adjacent the bottom end defining a substantially cylindrical interior surface having an inner diameter substantially identical with the outer diameter of the fixing ring substantially cylindrical exterior surface, at least one projection located on the annular hoop interior surface and spaced upwardly from the annular hoop bottom end to define a further inner diameter of the annular hoop, the further inner diameter being less than the outer diameter of the fixing ring substantially cylindrical exterior surface prior to assembly of the annular hoop and fixing ring so that as the annular hoop is moved onto the fixing ring into increased longitudinal engagement with the fixing ring the at least one projection being axially located at the level of the fixing ring when the hoop is fully mounted on the ring, the at least one projection inwardly deforms the exterior surface and transfers some axial load to the fixing ring so that after completion of the movement of the annular hoop further onto the fixing ring the engagement of the at least one projection with the fixing ring increases resistance to separation of the annular hoop from the fixing ring when oppositely directed forces are applied to the annular hoop and fixing ring, and so that, when the annular hoop is fully mounted on the fixing ring, the fixing ring extends axially below the projection.*

*33. The set of components according to claim 32, wherein, when the annular hoop is fully mounted on the fixing ring, the fixing ring also extends axially above the projection.*

*34. A set of components that can be assembled to form a substance dispenser assembly, the set comprising:*

*an annular fixing ring comprising a bottom portion and a top portion, the bottom portion having a fastening part, the top portion defining a receiving cavity, at least a radially outermost portion of the fixing ring defining a substantially cylindrical exterior surface that defines an outer diameter;*

*a dispensing member structured to be mounted in the fixing ring so that the dispenser member extends into the fixing ring cavity and projects upwardly through the top portion; and*

*an annular hoop having top and bottom ends and having an annular side wall with a height that is sufficient to completely enclose the fixing ring preventing the fastening part from moving radially outwardly when the annular hoop is mounted fully on the fixing ring, at least one projection located on an interior surface of the annular hoop and that defines a further inner diameter of the annular hoop, the further inner diameter being less than the outer diameter of the fixing ring substantially cylindrical exterior surface prior to assembly of the annular hoop and fixing ring so that as the annular hoop is moved onto the fixing ring the at least one projection inwardly deforms the exterior surface and so that, after completion of a movement of the annular hoop further onto the fixing ring, the projection is axially located at a level of the ring and the engagement of the at least one projection with the fixing ring increases resistance to separation of the annular hoop from the fixing ring when oppositely directed forces are applied to the annular hoop and the fixing ring, respectively, and so that, when the annular hoop is fully mounted on the fixing ring, the fixing ring extends axially below the projection.*

*35. The set of components according to claim 34, wherein the at least one projection comprises at least one annular shoulder.*

*36. The set of components according to claim 35, wherein the shoulder extends circumferentially and horizontally.*

*37. The set of components according to claim 34, wherein, when the annular hoop is fully mounted on the fixing ring, the fixing ring also extends axially above the projection.*

*38. A container and dispenser assembly comprising:*

*a container comprising a neck defining an opening into the container;*

*a dispenser;*

*a fixing ring to which the dispenser is mounted, the fixing ring comprising a bottom portion having a radially deformable part structured to engage the container neck and prevent removal of the fixing ring from the container neck, and a top portion defining a receiving cavity that receives at least a portion of the dispenser, the fixing ring further comprising an exterior surface;*

*a hoop around the fixing ring that prevents the radially deformable part from moving radially outwardly, the*

*hoop having at least one projection located on an inner surface of the hoop, the projection extending radially inwardly, the projection inwardly deforming the exterior surface of the fixing ring; and wherein, when the hoop is fully mounted on the fixing ring, the fixing ring extends axially below the projection.*

*39. The assembly according to claim 38, wherein the dispenser is a pump.*

*40. The assembly according to claim 38, wherein, when the annular hoop is fully mounted on the fixing ring, the fixing ring also extends axially above the projection.*

*41. A container and dispenser assembly comprising:*

*a container having a flange, the flange having an upper surface and a substantially cylindrical sidewall defining an outside diameter;*

*a fixing ring mounted on the flange of the container and comprising a lower portion and an upper portion, the lower portion and the upper portion together defining a total height of the fixing ring, the lower portion having a fastening part structured to engage the flange, the upper portion defining a receiving cavity with a central opening;*

*a dispenser mounted in the fixing ring, the dispenser including a pump engaged with the upper portion of the fixing ring and that extends upwardly through the central opening of the upper portion of the fixing ring;*

*a hoop mounted on the fixing ring having a central opening and comprising a bottom end, a top end, and an annular side wall, wherein the hoop surrounds the fixing ring and prevents the fastening part of the fixing ring from moving outwardly, at least a portion of the annular side wall comprising a substantially cylindrical interior surface defining an inner hoop diameter substantially the same as an outer diameter of an exterior surface of the fixing ring so that frictional engagement between the hoop and the fixing ring resists separation of the hoop from the fixing ring, the interior surface of the hoop including at least one projection that engages the exterior surface of the fixing ring when the hoop is fully mounted on the ring so as to increase axial resistance to separation of the hoop from the fixing ring when oppositely directed forces are applied to the hoop and the fixing ring, respectively; and wherein, when the annular hoop is fully mounted on the fixing ring, the fixing ring extends axially below the projection.*

*42. The assembly according to claim 41, wherein, when the annular hoop is fully mounted on the fixing ring, the fixing ring also extends axially above the projection.*

*43. A substance dispenser assembly comprising:*

*a fixing ring comprising a lower portion and an upper portion, the fixing ring upper portion having an upper portion height above the lower portion, the lower portion and the upper portion together defining a total height, the lower portion having a substantially circular-shaped interior defining a first inside diameter, the upper portion above the lower portion having a substantially cylindrical interior surface defining an opening having a second inside diameter that is smaller than the first inside diameter;*

*a dispenser mounted in the fixing ring, the dispenser including a pump having a body extending into the fixing ring and engaged with the fixing ring and having an upwardly extending dispenser head that extends upwardly through the opening having the second inside diameter;*

*a hoop mounted partially on the fixing ring having a central opening and comprising a bottom end, a top end, and an annular side wall so that when the hoop is mounted fully on the fixing ring the hoop peripherally surrounds the fixing ring and prevents the lower portion of the fixing ring from moving radially outwardly, and wherein at least a portion of the height of the annular side wall adjacent the bottom end comprises a substantially cylindrical interior surface defining a first inner hoop diameter substantially identical with an outer diameter of the fixing ring cylindrical exterior surface, the interior surface of the hoop including a plurality of projections extending along the annular side wall that engage the fixing ring cylindrical exterior surface to increase axial resistance to separation of the hoop from the fixing ring when oppositely directed forces are applied to the hoop and the fixing ring, respectively.*

*44. A substance dispenser assembly comprising:*

*an annular fixing ring comprising a lower portion and an upper portion, the upper portion above the lower portion and having an opening defining a receiving cavity;*

*a dispenser mounted in the fixing ring so as to extend into the receiving cavity and be in engagement with the upper portion of the fixing ring;*

*a hoop having a central opening and comprising a bottom end, a top end, and a peripheral side wall, so that when the hoop is fully mounted on the fixing ring the hoop will surround the fixing ring and prevent the lower portion of the fixing ring from expanding outwardly, wherein at least a portion of a height of the peripheral side wall near the bottom end comprises an interior opening dimensioned substantially the same as an outer dimension of the fixing ring so that, after the hoop is mounted partway on the fixing ring, frictional engagement between the hoop and the fixing ring resists separation of the hoop from the fixing ring, and wherein the interior surface of the hoop includes at least one engaging projection extending along at least a portion of the peripheral side wall and biting into an outer surface of the fixing ring when the hoop is fully mounted on the fixing ring; and wherein, when the annular hoop is fully mounted on the fixing ring, the fixing ring extends axially below the projection.*

*45. The substance dispenser assembly according to claim 44, comprising a plurality of engaging projections.*

*46. The substance dispenser assembly to claim 44, wherein, when the annular hoop is fully mounted on the fixing ring, the fixing ring also extends axially above the projection.*

* * * * *